(12) United States Patent
Chappel

(10) Patent No.: US 9,357,891 B1
(45) Date of Patent: Jun. 7, 2016

(54) CLEANING APPARATUS HOLDER

(71) Applicant: Richard C. Chappel, Warwick, RI (US)

(72) Inventor: Richard C. Chappel, Warwick, RI (US)

( * ) Notice: Subject to any disclaimer, the term of this patent is extended or adjusted under 35 U.S.C. 154(b) by 0 days.

(21) Appl. No.: 14/817,509

(22) Filed: Aug. 4, 2015

(51) Int. Cl.
*A47L 9/00* (2006.01)
*A47L 5/28* (2006.01)
*F16M 13/02* (2006.01)
*A47L 15/42* (2006.01)

(52) U.S. Cl.
CPC ... *A47L 9/00* (2013.01); *A47L 5/28* (2013.01); *A47L 9/0054* (2013.01); *A47L 9/0063* (2013.01); *A47L 15/427* (2013.01); *F16M 13/022* (2013.01)

(58) Field of Classification Search
CPC ....... A47L 9/00; A47L 9/0063; A47L 9/0054; A47L 15/427
USPC .......................................................... 15/411
See application file for complete search history.

(56) References Cited

U.S. PATENT DOCUMENTS

| | | | | |
|---|---|---|---|---|
| 1,884,867 | A * | 10/1932 | Replogle | 15/336 |
| 1,983,567 | A * | 12/1934 | Replogle et al. | 15/336 |
| 3,048,876 | A * | 8/1962 | Kemnitz | 15/321 |
| 3,231,922 | A * | 2/1966 | Smith | 15/339 |
| 4,156,952 | A * | 6/1979 | Lynch, Jr. | 15/320 |
| 4,364,146 | A * | 12/1982 | Bowerman | 15/323 |
| 4,472,855 | A * | 9/1984 | Murphy et al. | 15/323 |
| 5,311,638 | A * | 5/1994 | Furcron et al. | 15/321 |
| 7,516,565 | B1 * | 4/2009 | Tsen | 38/77.1 |
| 7,823,251 | B2 * | 11/2010 | Dyson et al. | 15/336 |
| 8,001,653 | B1 * | 8/2011 | Longley et al. | 15/367 |
| 8,312,591 | B1 * | 11/2012 | Wolfe et al. | 15/323 |
| 8,336,164 | B2 * | 12/2012 | Coleman et al. | 15/410 |
| 8,522,396 | B2 * | 9/2013 | Worker et al. | 15/410 |
| 8,720,003 | B2 * | 5/2014 | Seo | 15/411 |
| 8,800,102 | B1 * | 8/2014 | Massey | 15/320 |
| 8,819,882 | B2 * | 9/2014 | De Wit et al. | 15/49.1 |
| 8,850,654 | B2 * | 10/2014 | Nolan et al. | 15/321 |
| 8,966,708 | B2 * | 3/2015 | Worker et al. | 15/336 |
| 9,009,913 | B2 * | 4/2015 | Wills et al. | 15/350 |
| 9,009,915 | B2 * | 4/2015 | Song et al. | 15/354 |
| 9,060,662 | B2 * | 6/2015 | Seo et al. | |
| 2002/0162187 | A1 * | 11/2002 | Keller | 15/345 |
| 2003/0101536 | A1 * | 6/2003 | Hefter et al. | 15/339 |
| 2005/0273972 | A1 * | 12/2005 | Park | 15/414 |
| 2009/0064449 | A1 * | 3/2009 | Newton et al. | 15/327.1 |
| 2009/0089969 | A1 * | 4/2009 | Lee et al. | 15/411 |
| 2009/0165242 | A1 * | 7/2009 | Lee et al. | 15/411 |
| 2011/0219571 | A1 * | 9/2011 | Dyson et al. | 15/344 |
| 2012/0180258 | A1 * | 7/2012 | Seo | 15/354 |
| 2014/0352105 | A1 * | 12/2014 | Bosses | 15/415.1 |
| 2015/0067981 | A1 * | 3/2015 | Faremo et al. | 15/354 |
| 2015/0265113 | A1 * | 9/2015 | Yoon et al. | |

FOREIGN PATENT DOCUMENTS

| | | | |
|---|---|---|---|
| AT | 390362 B | * | 4/1990 |
| DE | 10016287 A1 | * | 10/2001 |
| DE | 19540862 C2 | * | 2/2002 |

(Continued)

*Primary Examiner* — Eret McNichols
(74) *Attorney, Agent, or Firm* — Salter & Michaelson

(57) ABSTRACT

A holder for securing a cleaning apparatus in an upright position and comprised of a base plate, an upright arm, and a hinge for securing the upright arm to a top surface of the base plate. A top end of the upright arm is for engagement with a bracket on the cleaning apparatus. The base plate preferable also has a resilient pad on an under surface to assist in maintaining the base plate stationary.

14 Claims, 14 Drawing Sheets

(56) References Cited

FOREIGN PATENT DOCUMENTS

| | | | | |
|---|---|---|---|---|
| DE | 10141088 C1 * | 4/2003 | | A47L 13/42 |
| DE | 102007037545 A1 * | 2/2009 | | A46B 17/00 |
| EP | 1838195 B1 * | 3/2013 | | |
| EP | 2572619 A2 * | 3/2013 | | |
| GB | 2452549 B * | 3/2012 | | |
| KR | 101187077 B1 * | 9/2012 | | |
| KR | 101208556 B1 * | 12/2012 | | |
| WO | WO 9218045 A1 * | 10/1992 | | A47L 9/00 |
| WO | WO 0004814 A1 * | 2/2000 | | |
| WO | WO 2014041214 A1 * | 3/2014 | | |

\* cited by examiner

CLEANING APPARATUS HOLDER

FIELD OF THE INVENTION

The present invention relates to a holder for retaining a cleaning apparatus in place. More particularly, the present invention relates to a holder for fixing the position, particularly of an upright vacuum cleaner. Even more particularly, the holder of the present invention is for fixing the position of an upright vacuum cleaner so as to enable the use of a separate cleaning hose attached to the vacuum cleaner and in a manner so as to avoid a tipping over or otherwise inadvertent movement of the vacuum cleaner even when the hose is stretched to its maximum length.

BACKGROUND OF THE INVENTION

Upright vacuum cleaners and the like devices are extensively used and are typically provided with a separately attached hose for vacuuming areas other than the carpet. One of the main problems associated with the use of, in particular, the elongated flexible hose, is that if it is stretched to virtually any extent the upright vacuum cleaner is prone to tip over or at least inadvertently move to an undesired location. The elongated hose that is attached to the upright vacuum cleaner typically is constructed of an accordion-pleated tubular structure. However, when this hose is extended to any substantial extent, there is a substantial force that is transferred back to the vacuum cleaner causing the aforementioned tipping over or inadvertent undesirable movement. The volume of dissatisfied customers buying an upright vacuum and trying to use it to vacuum other than floor is significant. Using an onboard wand is listed as a feature but frankly is one of the main problems as to use with the product.

The upright vacuum cleaner has been an enormously popular device for cleaning floors and particularly carpeted floors. However, for cleaning stairs, ceiling areas and difficult to reach areas, the upright vacuum cleaner was useless until an expandable hose attachment became available which was incorporated into the handle of the upright vacuum cleaner. However, vacuuming with the hose attachment has very limited application as:

1. The length of the expandable hose requires constant repositioning of the upright vacuum cleaner as it is pulled by the user to get to additional areas. The user is limited in vacuuming when stretching the hose causing the upright vacuum cleaner to move often bumping into furniture, lamps and other objects on the floor. Pulling hard enough causes the upright vacuum cleaner to tip over.

2. The vacuum created in the hose sucks the hose back creating additional limitation of the hose length.

3. The upright vacuum cleaner must either be pulled around the repositioned by the user of the hose avoiding other objects on the floor or the upright vacuum cleaner will tip over.

These limitations are typically not discovered until the user attempts to use the hose attachment. Consequently, the complaints for using the hose attachment of the upright vacuum cleaner have been significant and have been expressed vociferously in social media.

An alternative for vacuuming stairs, ceiling areas and difficult to reach places is to use a canister (as opposed to upright) vacuum cleaner at additional expense and requiring the user to carry the canister with one hand while vacuuming with the hose with the other hand.

Accordingly, it is an object of the present invention to provide a holder for retaining the position of a cleaning apparatus, particularly an upright vacuum cleaner.

Another object of the present invention is to provide a holder for fixing the position of an upright vacuum cleaner so that the upright vacuum cleaner is not prone to tipping over or inadvertent movement even when the attached hose is stretched to its maximum length.

Still another object of the present invention is to provide a holder for fixing the position of an upright vacuum cleaner to enable the use of a separate cleaning hose attached to the vacuum cleaner and in a manner so as to avoid a tipping over, twisting or otherwise inadvertent movement of the vacuum cleaner.

Accordingly, it is an object of this invention to provide a holder which keeps the upright vacuum cleaner in a fixed position while the user is operating the hose attachment. This allows the user to stretch the hose to its maximum expansion reaching additional areas that cannot otherwise be reached without the upright vacuum cleaner tipping over or moving and bumping into other objects on the floor.

SUMMARY OF THE INVENTION

To accomplish the foregoing and other objects, features and advantages of the present invention there is provided a holder for securing a cleaning apparatus in an upright position and comprised of a base plate, an upright arm, and a hinge for securing the upright arm to a top surface of the base plate. A top end of the upright arm is for engagement with a bracket on the cleaning apparatus. The base plate is positioned for engagement with the wheels of the cleaning apparatus to stabilize the base plate.

In accordance with other aspects of the present invention one embodiment comprises a base plate with at least side legs positioned to extend in the direction of the cleaning apparatus and constructed and arranged for engagement with the wheels of the cleaning apparatus, and further including a resilient pad secured under the base plate and extending upward on the front edge of the base plate to inhibit any sliding motion of the base plate relative to the cleaning apparatus; the base plate has a pair of spaced apart legs extending in the direction of the cleaning apparatus and constructed and arranged for engagement with spaced apart respective wheels of the cleaning apparatus; the pair of spaced apart legs define therebetween a recess having an elongated contact surface for engagement with a circular surface of each wheel; the pair of spaced apart legs may be fixed or adjustable to vary the spacing therebetween so as to accommodate different cleaning apparatus having a different spacing between spaced apart respective wheels of the cleaning apparatus; in an alternate embodiment the base plate has at least one side recess positioned to extend in the direction of the cleaning apparatus and constructed and arranged for engagement with a wheel of the cleaning apparatus; the base plate has a pair of spaced apart recesses extending in the direction of the cleaning apparatus and constructed and arranged for engagement with spaced apart respective wheels of the cleaning apparatus; the pair of spaced apart recesses can be adjustable to vary the spacing between the recesses to accommodate differences between various cleaning apparatus models; a bottom end of the upright arm has a slanted surface so that an angle of less than 90 degrees is provided between the upright arm and the base plate, and further including a resilient pad under the base plate extending upward on the font edge of the base plate to inhibit any sliding motion of the base plate; and wherein the angle may be on the order of 75 degrees.

In accordance with another embodiment of the present invention there is provided a combination cleaning apparatus and a holder for securing the cleaning apparatus in an upright position. The cleaning apparatus is provided with a bracket that forms a locking surface. The holder includes a base plate, an upright arm, and a hinge for securing the upright arm to a top surface of the base plate. A top end of the upright arm has guides which make engagement easier with the bracket on the cleaning apparatus so as to lock the cleaning apparatus in position and to prevent slippage of the cleaning apparatus.

In accordance with still other aspects of the present invention the combination provides the base plate has a pair of spaced apart legs extending in the direction of the cleaning apparatus and constructed and arranged for engagement with spaced apart respective wheels of the cleaning apparatus; the pair of spaced apart legs define therebetween a recess having an elongated contact surface for engagement with a circular surface of each wheel; the pair of spaced apart legs may be adjustable to vary the spacing therebetween so as to accommodate different cleaning apparatus having a different spacing between spaced apart respective wheels of the cleaning apparatus; alternatively, the base plate has at least one side recess positioned to extend in the direction of the cleaning apparatus and constructed and arranged for engagement with a wheel of the cleaning apparatus; the base plate has a pair of spaced apart recesses extending in the direction of the cleaning apparatus and constructed and arranged for engagement with spaced apart respective wheels of the cleaning apparatus; and the pair of spaced apart recesses is adjustable to vary the spacing between the recesses.

In accordance with a further embodiment of the present invention there is provided a method of stabilizing a cleaning apparatus in which the cleaning apparatus has an upright structure making the cleaning apparatus somewhat top heavy and prone to tipping over when used with a wand. The cleaning apparatus includes a stabilizing bracket, and the method includes providing a holder for securing the cleaning apparatus in an upright position and including of a base plate, an upright arm, and a hinge for securing the upright arm to a top surface of the base plate. The next step is positioning the holder by sliding the holder so that the base plate engages with one or more wheels of the cleaning apparatus, and during said sliding, inserting a top end of the upright arm for engagement with the stabilizing bracket on the cleaning apparatus. Other features include having a bottom end of the upright arm with a slanted surface so that an angle of less than 90 degrees is provided between the upright arm and the base plate, so that there is a force imposed by the upright arm engaging the stabilizing bracket; and the step of sliding the base plate so that both wheels of the cleaning apparatus are engaged by the base plate.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 8:
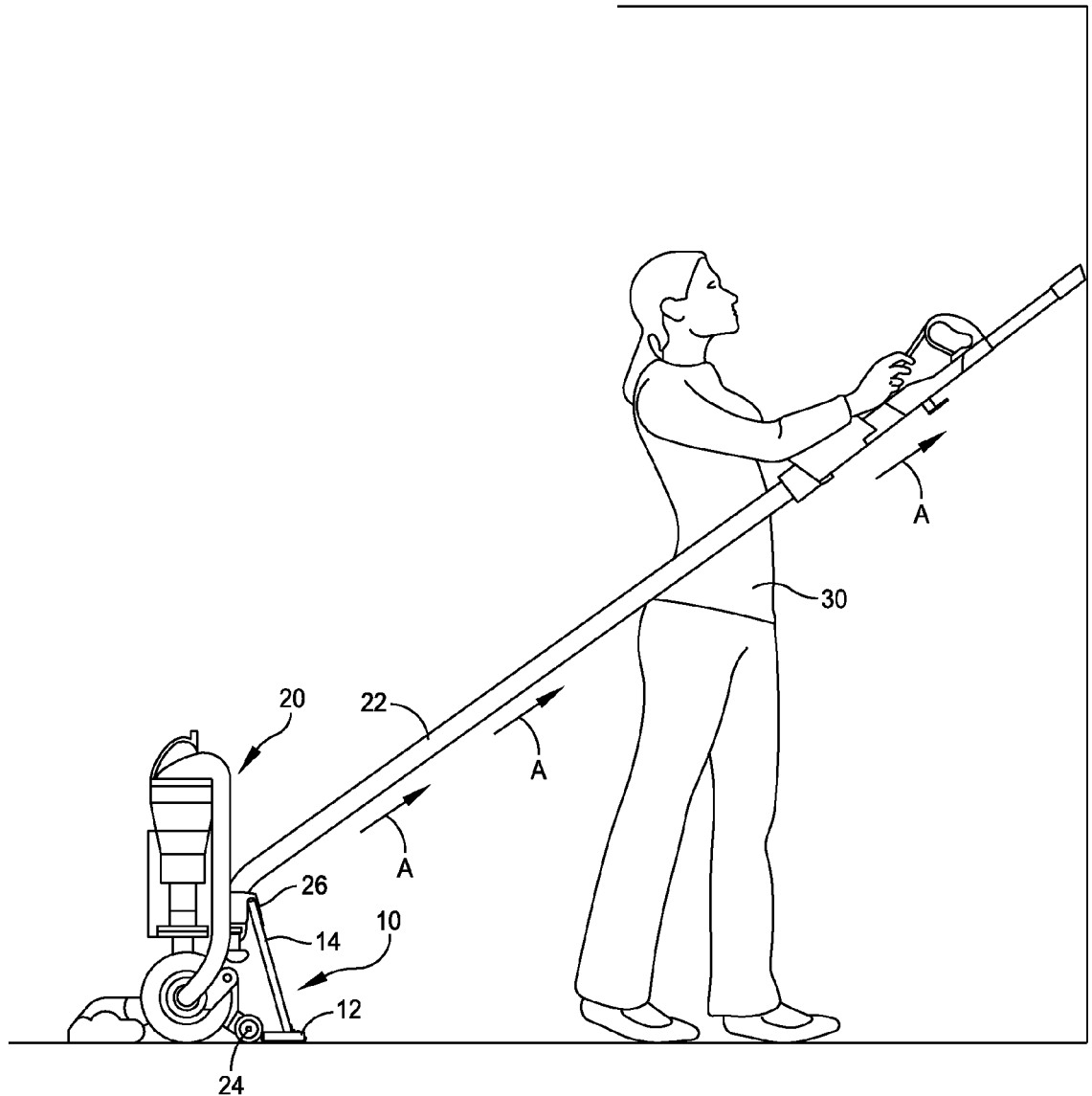
FIG. 8 is an illustration showing the holder in place relative to the upright vacuum cleaner and further illustrating a user grasping and operating the separately attached hose.
Figure 9:
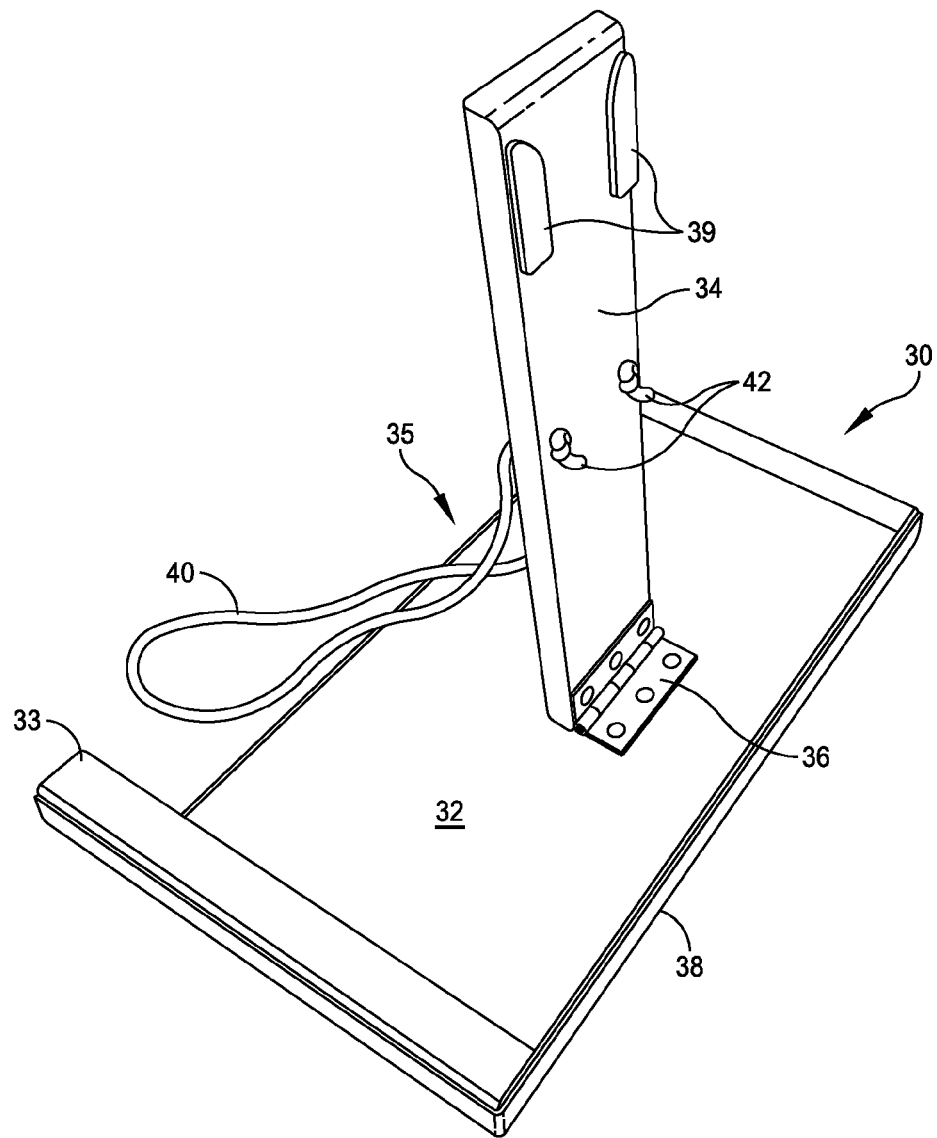
FIG. 9 is a perspective view of a second embodiment of the present invention.
Figure 10:
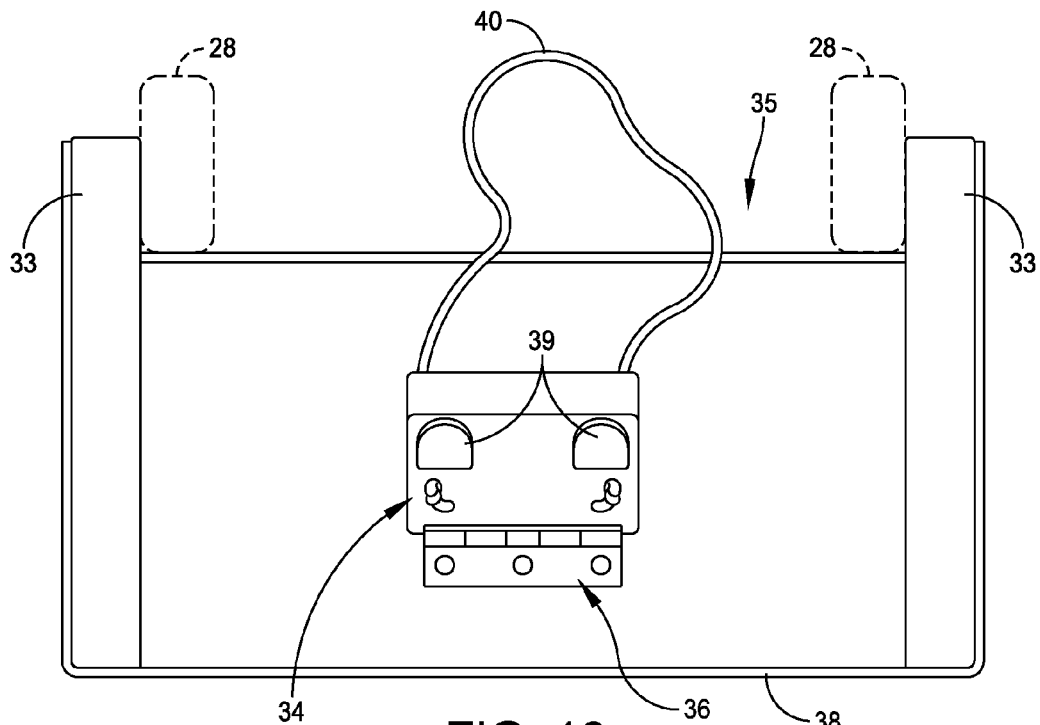
FIG. 10 is a plan view of the holder of FIG. 9.
Figure 11:
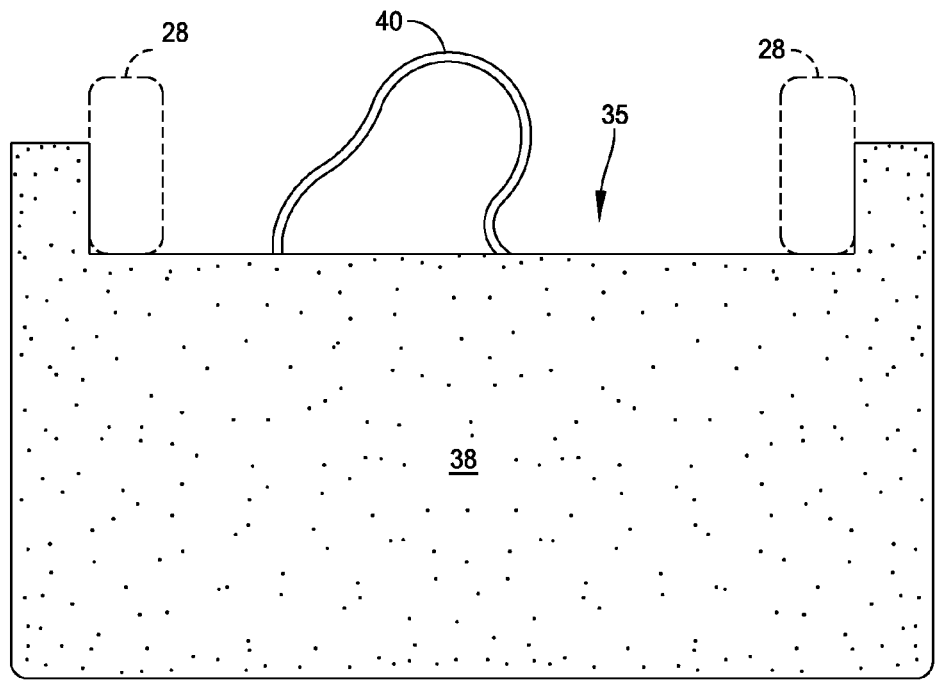
FIG. 11 is a bottom view of the holder of FIG. 9.

As indicated previously, one of the problems associated with the use of an upright vacuum cleaner with the hose feature incorporated into the vertical handle, is that as soon as the hose is extended any distance from the top of the handle there is a tendency for the vacuum cleaner to tip over. In this regard, reference may be made to FIG. 8 illustrating a user at 30 vacuuming an area other than the carpet. In FIG. 8 the expandable hose 22 is shown being pulled in the direction of arrows A. Without the use of the holder 10 illustrated in FIG. 8, there would be a clear tendency for the upright vacuum cleaner 20 to tip over. The hose is typically connected toward an upper part of the apparatus making the apparatus susceptible to tipping over. However, FIG. 8 illustrates the holder 10 in position relative to the upright vacuum cleaner 20 and in particular engaged with the wheels 24 thereof. The holder also preferably has a lower resilient pad surface 18 that assists in maintaining the holder in place, along with a force that is imposed by virtue of the upright arm 14 of the holder engaging a flange or bracket 26 of the upright vacuum cleaner structure.

Figure 5:
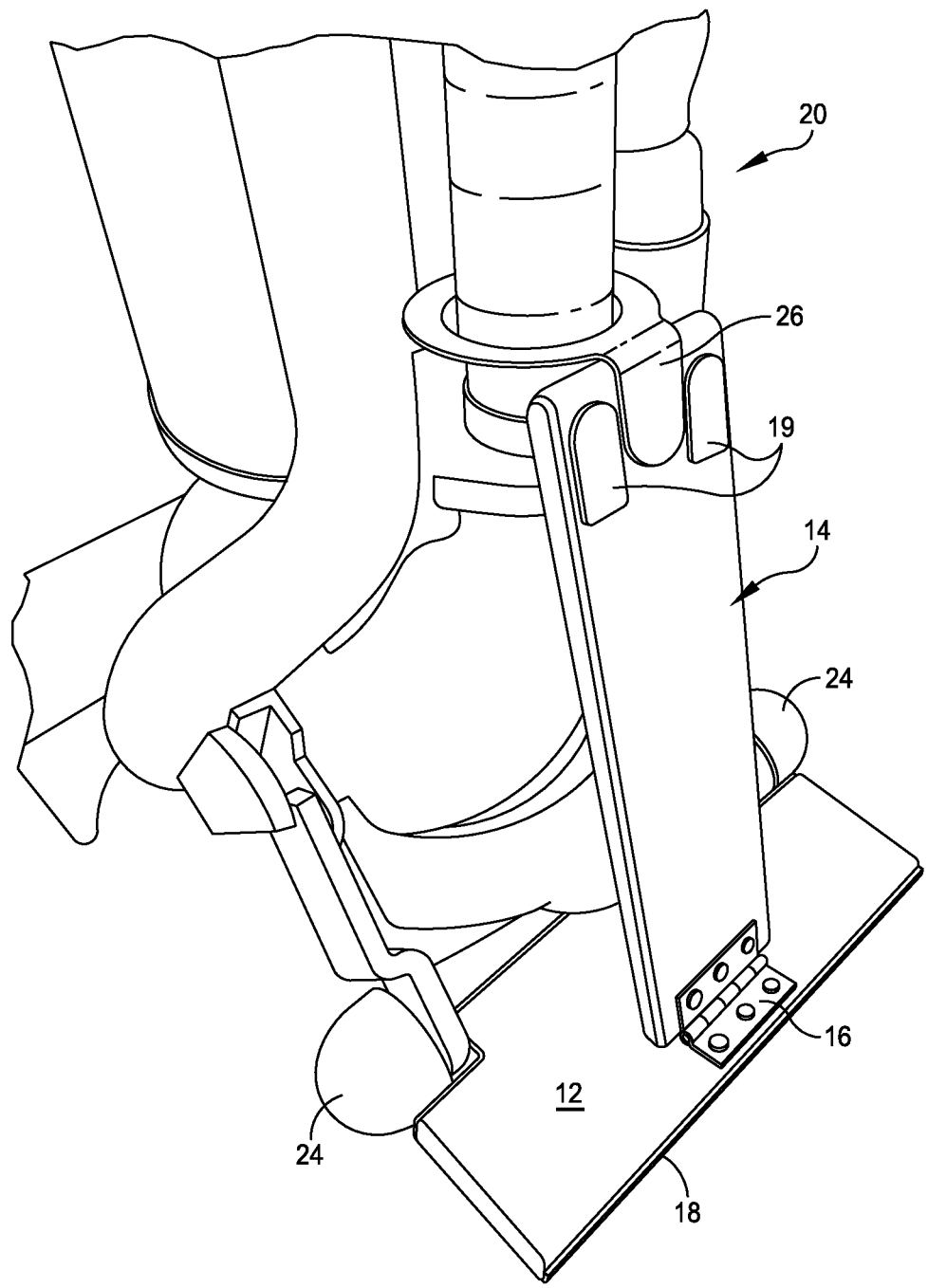
FIG. 5 is a perspective view of the holder illustrating its engagement with an upright vacuum cleaner.
Figure 6:
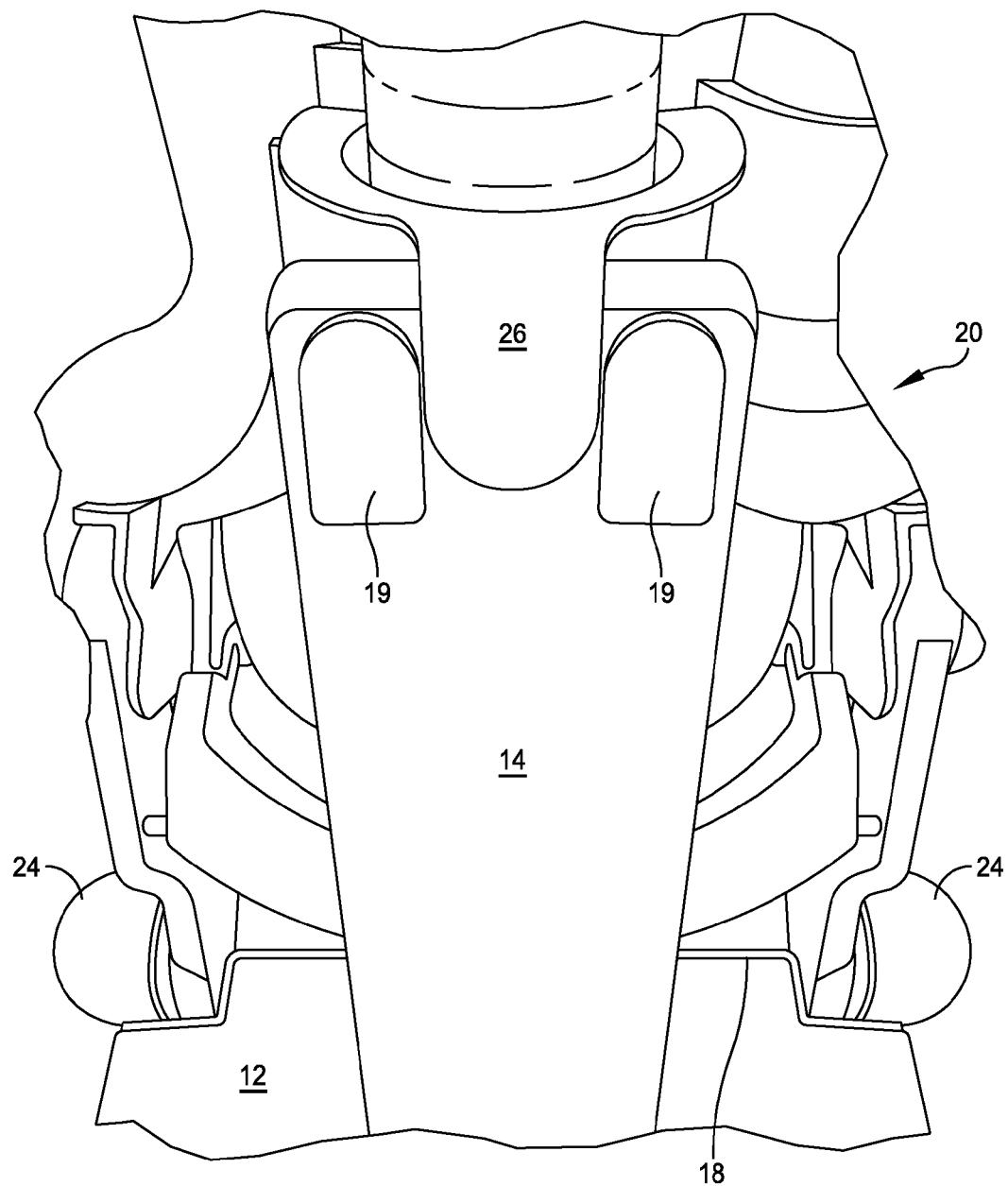
FIG. 6 is an enlarged fragmentary view illustrating the manner in which the holder engages with a component of the upright vacuum cleaner.

A first embodiment of the present invention is illustrated in FIGS. 1-7. This is illustrated in the form of a holder 10 that may be constructed of a wood, plastic or a lightweight metal material such as aluminum. The holder 10 is comprised of a base plate 12, an upright arm 14 and a hinge 16 for securing the upright arm to a top surface of the base plate. A top end of the upright arm is meant for engagement with a bracket or flange 26 on the cleaning apparatus 20. In this regard, refer to the perspective view of FIG. 5 that shows the top end of the upright arm 14 engaged with the bracket or flange 26. This bracket 26 is provided on the upright cleaning apparatus and may typically be used for wrapping a cord thereabout. This bracket thus also has the dual use of retaining the top end of the upright arm 14. The bracket 26 in combination with another bracket that is rotated is used to store the electric cord when the vacuum is not in use. FIG. 5 also illustrates tabs 19 secured to a flat surface of the upright arm 14. These tabs 19 function as a guide for positioning of the holder relative to the bracket 26. Refer also to the enlarged fragmentary view of FIG. 6 showing the position of the bracket 26 relative to these tabs 19.

Figure 1:
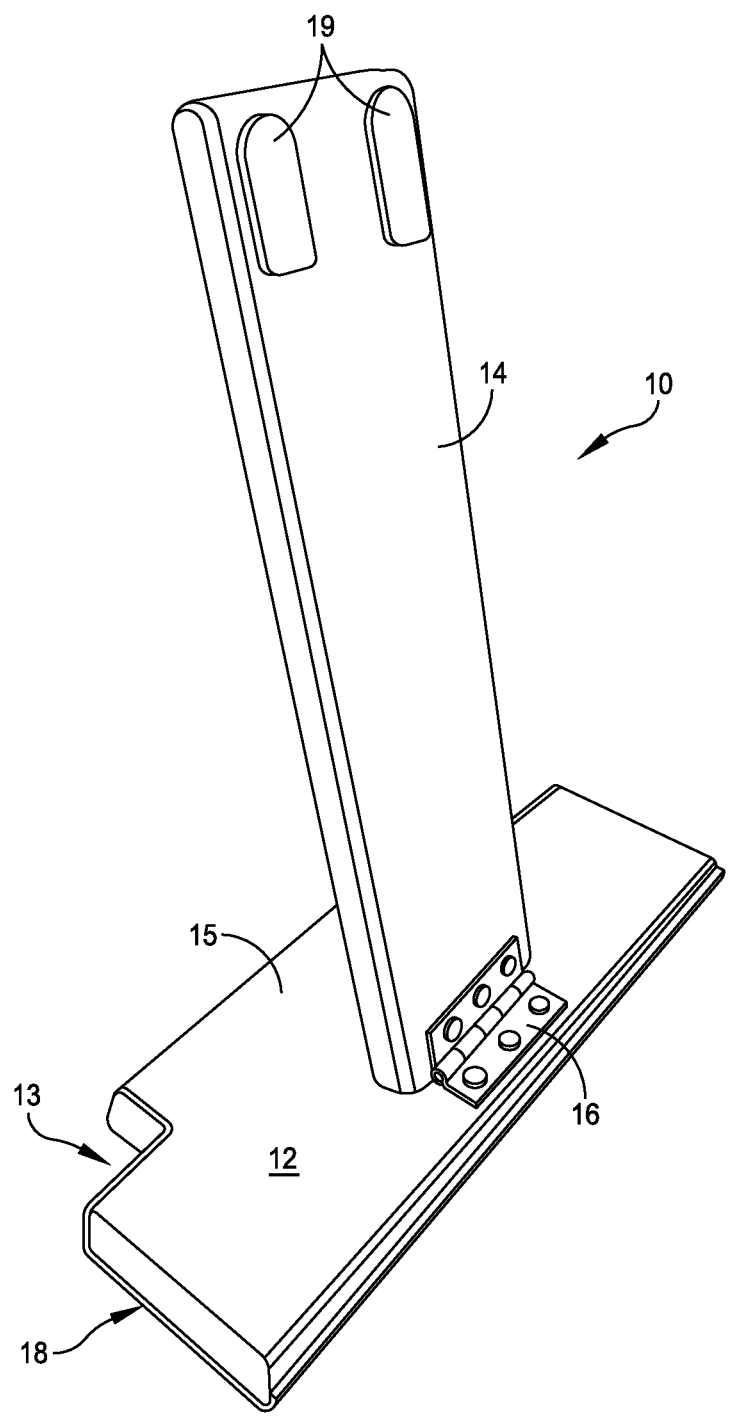
FIG. 1 is a perspective view of a first embodiment of the present invention.
Figure 2:
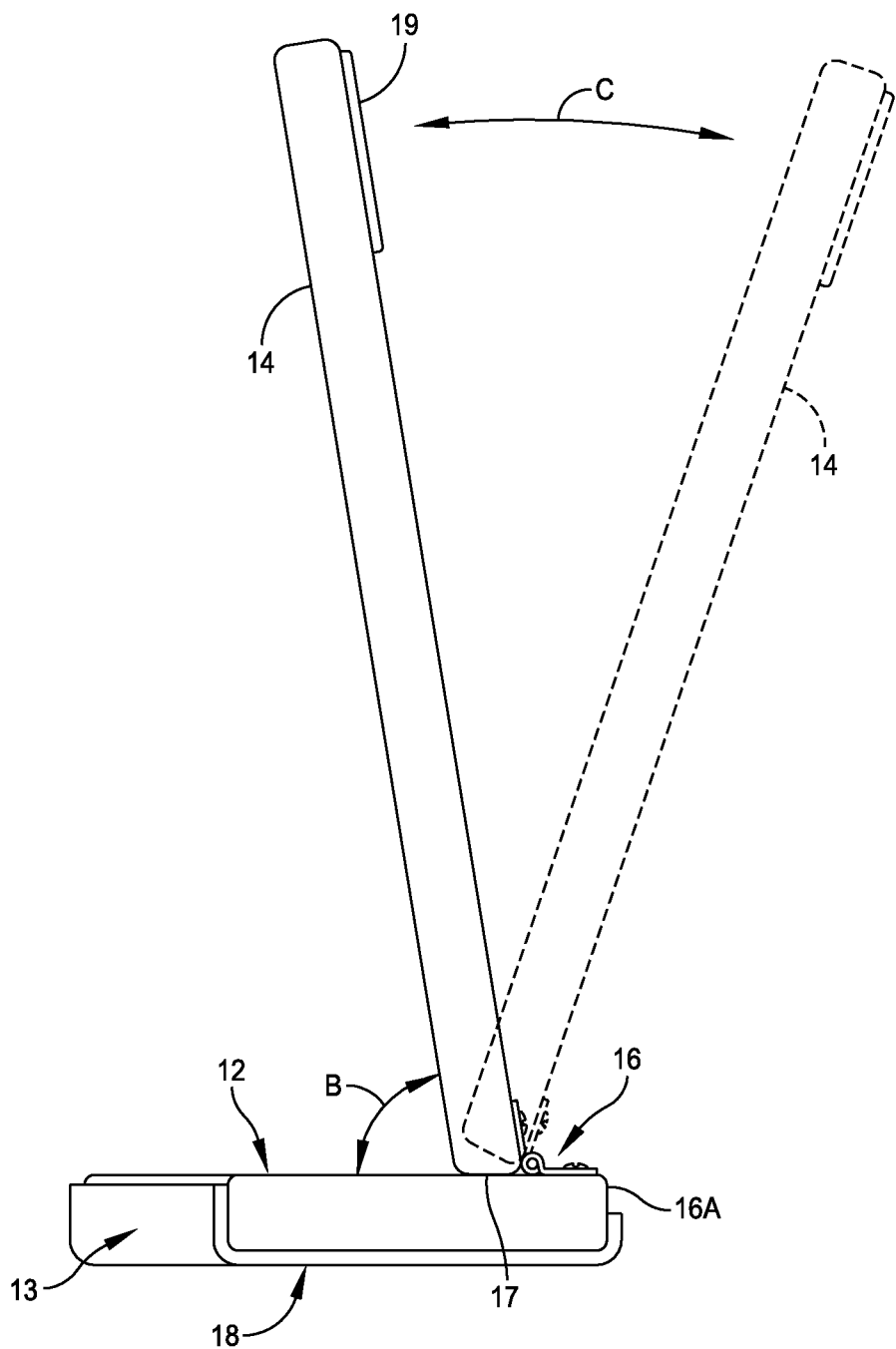
FIG. 2 is a side elevation view of the holder of FIG. 1.
Figure 3:
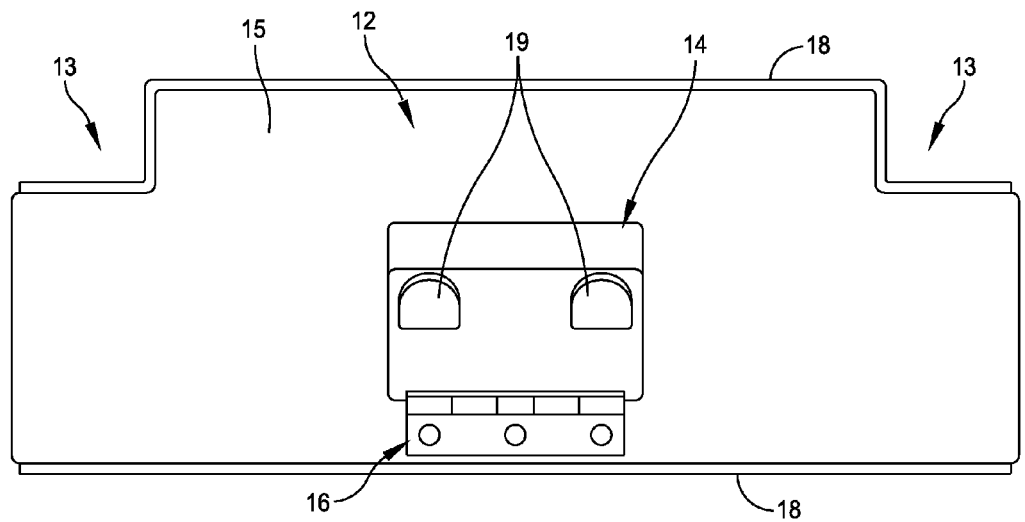
FIG. 3 is a top view of the holder of FIG. 1.
Figure 4:
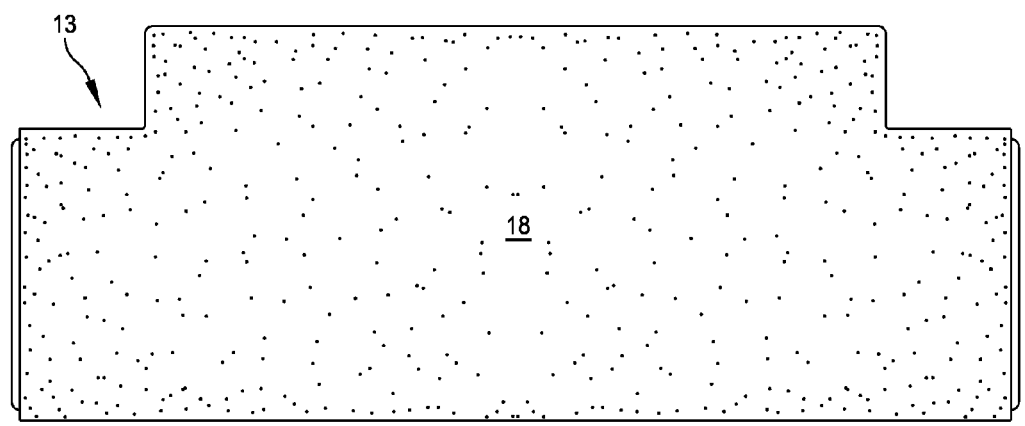
FIG. 4 is a bottom view of the holder of FIG. 1.

With further reference to FIGS. 1-4, it is noted that the base plate 12 is also preferably provided on its lower surface, as well as some side walls, with the resilient pad 18. It is also noted that the base plate 12 is provided with end recesses 13 forming an elongated side 15 between these recesses. Refer to FIGS. 1 and 3. Refer also to the perspective view of FIG. 5 that shows the recesses engaged with a respective wheel 24, or the wheel support. The elongated side 15 fits within the spacing between the wheels, or the wheel supports as illustrated in FIG. 5. With reference to FIG. 2, it is noted that the hinge 16 is preferably provided closely adjacent to a side 16A of the base plate 12. It is furthermore noted that the upright arm 14 is provided with a tapered bottom surface 17. In FIG. 2 the arrow B illustrates the preferred angle of the upright arm 14. This angle may be in a range of 65-80 degrees and is preferably on the order of 75 degrees. This angle B is formed by virtue of having the taper at 17 at the bottom end of the upright arm 14. FIG. 2 also illustrates in dotted outline the manner in which the arm 14, when not in use can be pivoted even to a position such as shown and described hereinafter in FIG. 13. In FIG. 2 refer to the double headed arrow C illustrating the pivoting of the upright arm 14. In that dotted position the arm 14 is essentially in parallel with the base plate 12. However, in FIGS. 5 and 6, in solid outline, there is illustrated the position where the upright arm interlocks with the vacuum cleaner bracket 26. As previously discussed in connection with the diagram in FIG. 8, when the force indicated by arrows A is imposed, there is a tendency of the upright arm 14 to even further lock with the bracket 26 and thus retain the upright vacuum cleaner in a proper position, such as illustrated in FIG. 8. The holder 10 thus prevents the vacuum cleaner 20 from tipping over.

Figure 7:
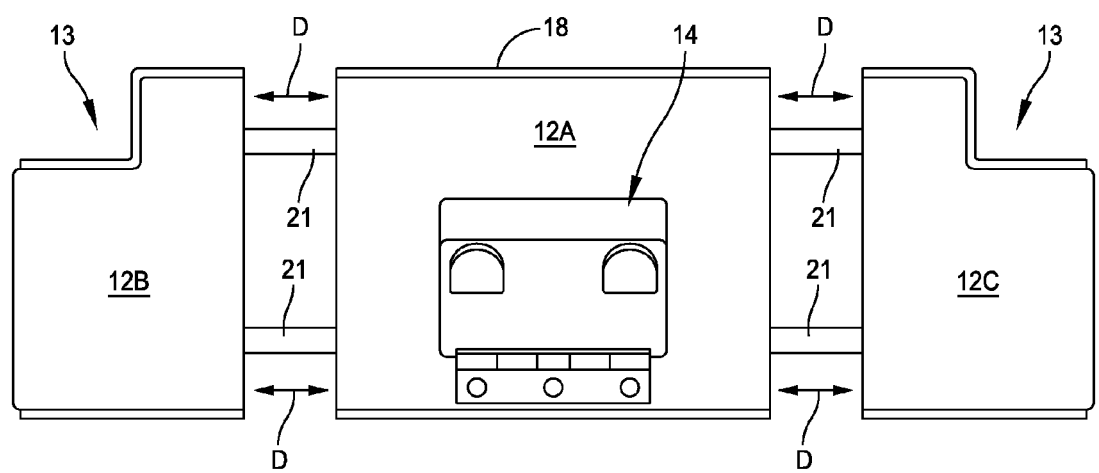
FIG. 7 is a plan view of an alternate embodiment of the holder in which the holder is adjustable.

Reference is now made to a slightly alternate embodiment of the one illustrated in FIGS. 1-6. In this embodiment the base plate is essentially adjustable in the direction of arrows D as shown in FIG. 7. For this purpose, base plate 12 is separated into three separate sections including a center section 12A at which the upright arm is secured and respective end sections 12B and 12C. This adjustment can be by means of rods 21 illustrated in FIG. 7. Some type of a securing mechanism (not shown) can be used for fixing the position of the plate ends 12B and 12C at the desired width. This would depend upon the spacing between the wheels of the upright vacuum cleaner. In another embodiment of the present invention, it may be possible to also provide adjustment at only one end of the base plate.

Reference is now made to a second embodiment of the present invention illustrated in FIGS. 9-14. FIGS. 15 and 16 illustrate an alternative wherein the legs of the base plate are transversely adjustable. The holder illustrated in FIGS. 9-14 is comprised of a base plate 32, an upright arm 34, and a hinge 36. The hinge 36 is appropriately secured to the upper surface of the base plate 32 as well as to the lower end of the upright arm 34. Thus, in the embodiment of FIG. 9, rather than having recesses at the end of the base plate, there are provided opposite legs 33. With the use of the legs 33, there is thus provided a recess area 35. This recess area 35 is meant to engage against the wheels 28. In this regard, refer to the perspective view of FIG. 12 that illustrates the engagement between the holder 30 and the wheels 28 of the upright vacuum cleaner. This illustrates the wheels moving into the recess 35 while the legs 33 on either side engage at an outer edge of each of the respective wheels 28.

Figure 12:
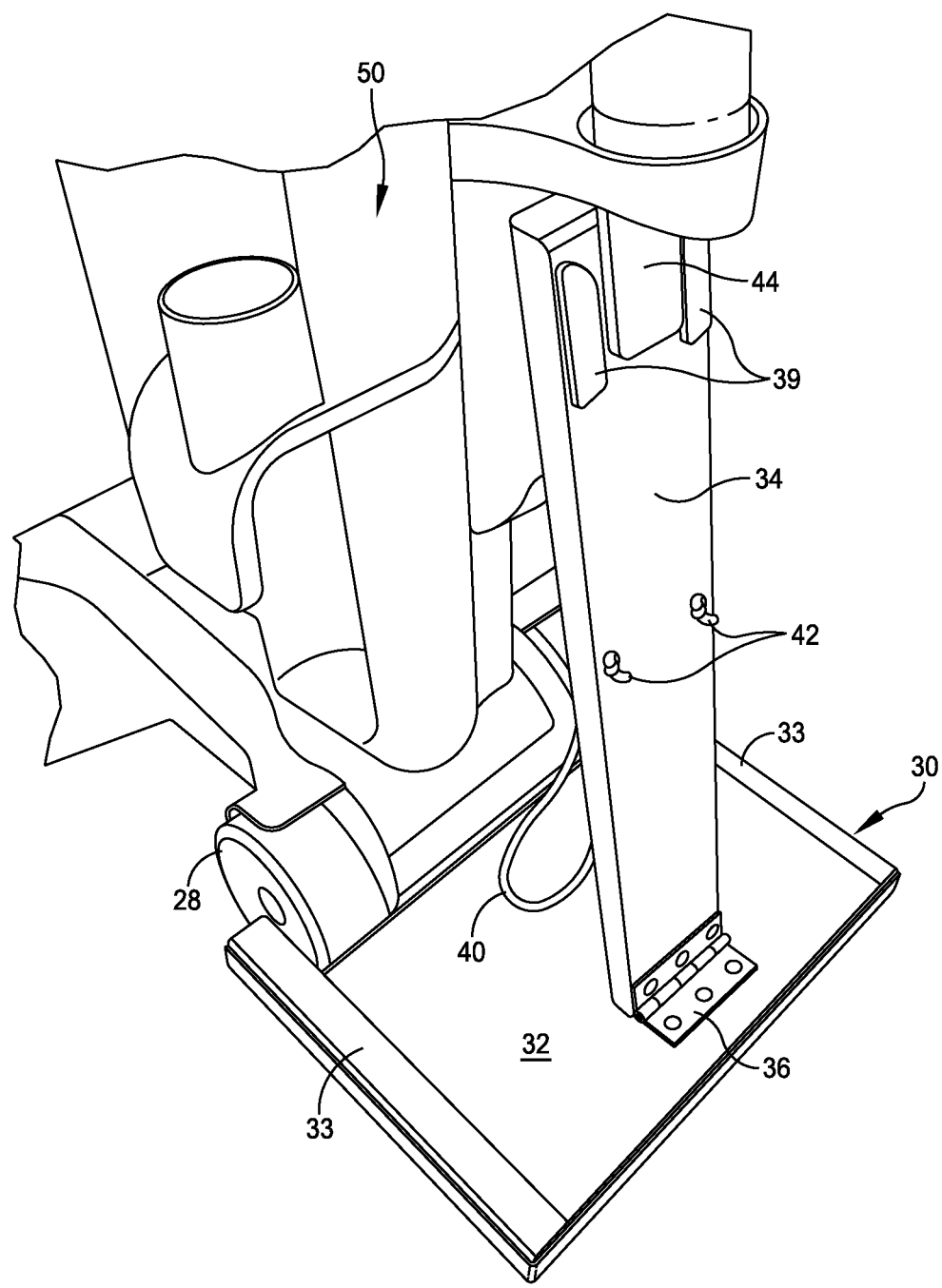
FIG. 12 is a perspective view illustrating the holder of FIG. 9 as positioned relative to the upright vacuum cleaner.
Figure 13:
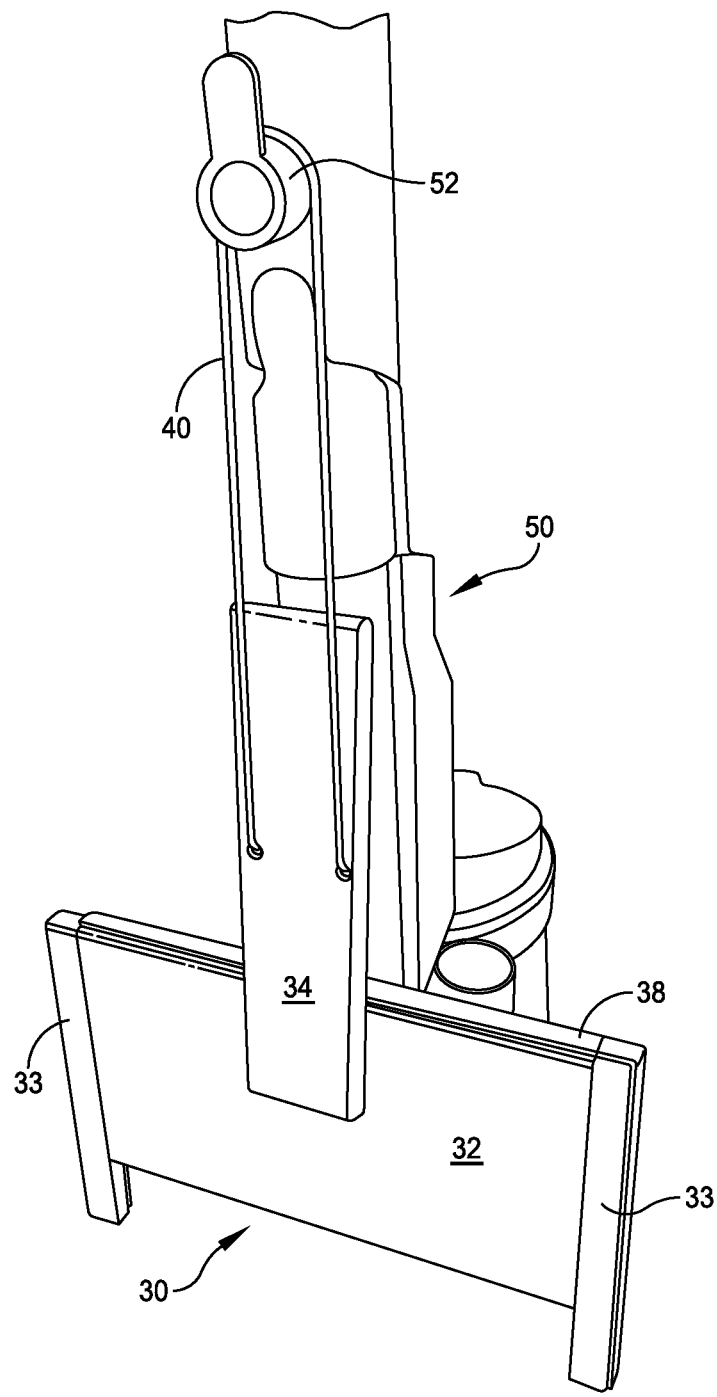
FIG. 13 illustrates the holder having been hung from the bracket.

In the embodiment illustrated in FIG. 12, there are also provided spaced apart tabs 39 that are positioned on either side of the upright vacuum cleaner bracket 44. The upright arm 42 is also provided with a pair of holes for receiving a cord 40. The cord 40 is formed in a loop with ends 42 tied into a knot so as to retain the cord 40 as in the position shown in FIGS. 10 and 12. Refer also to FIG. 13 that shows the holder 30 having been folded into a flat position with the cord 40 used for hanging the holder from a bracket 52 of the vacuum cleaner 50.

Figure 14:
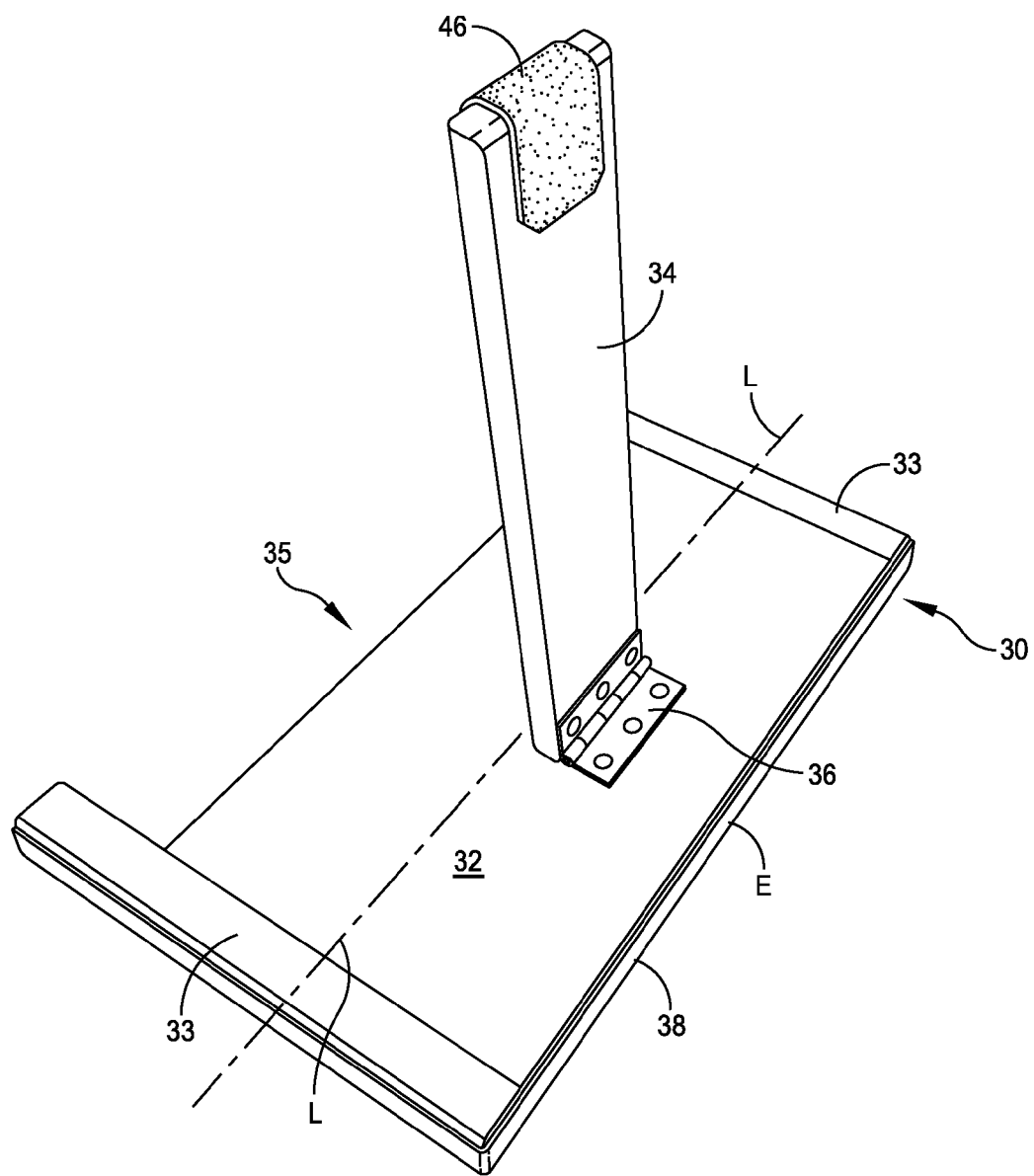
FIG. 14 is a perspective view of an embodiment similar to that illustrated in FIG. 9.
Figure 15:
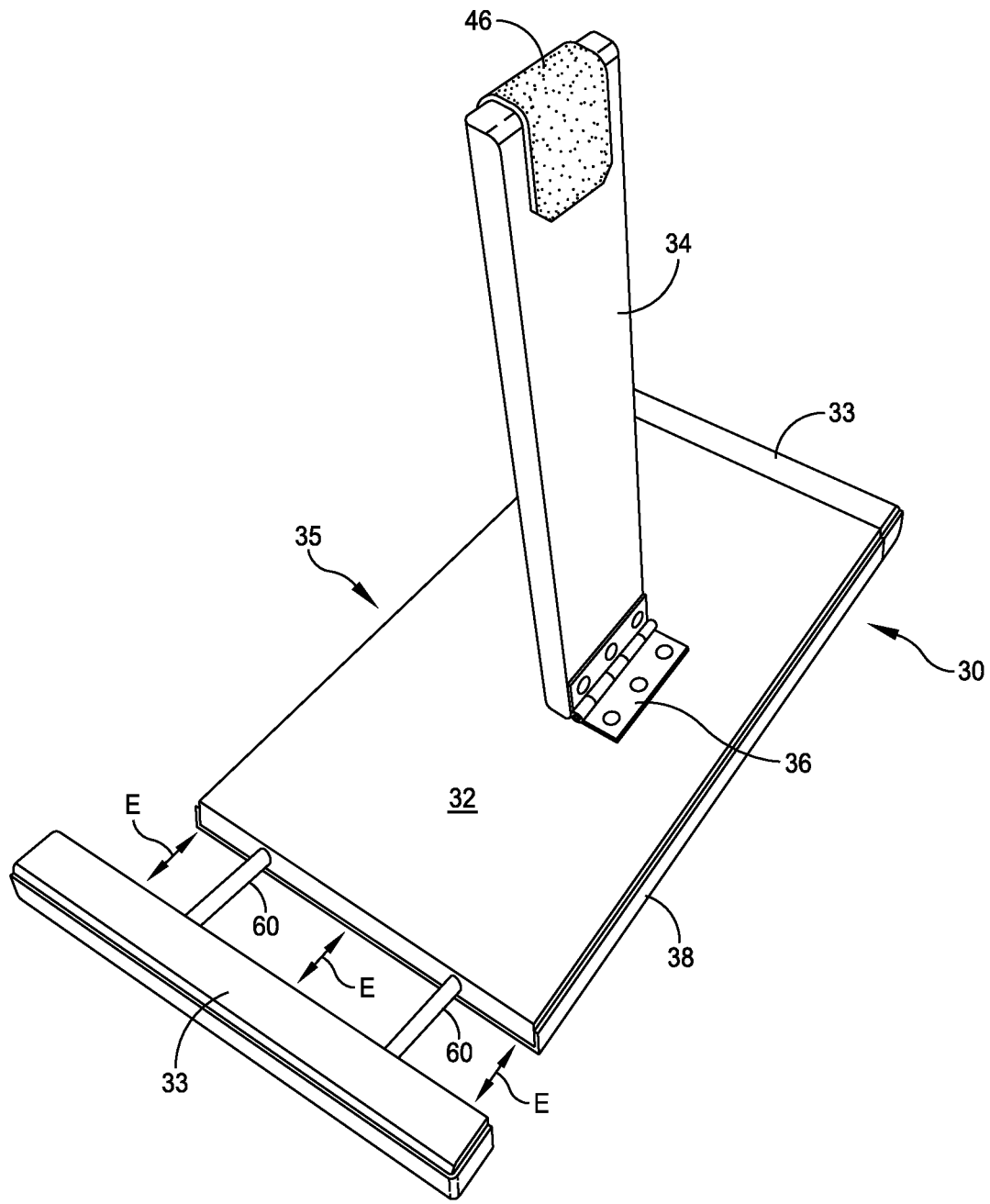
FIG. 15 is a perspective view similar to that illustrated in FIG. 14 in which the width of the base plate is adjustable.
Figure 16:
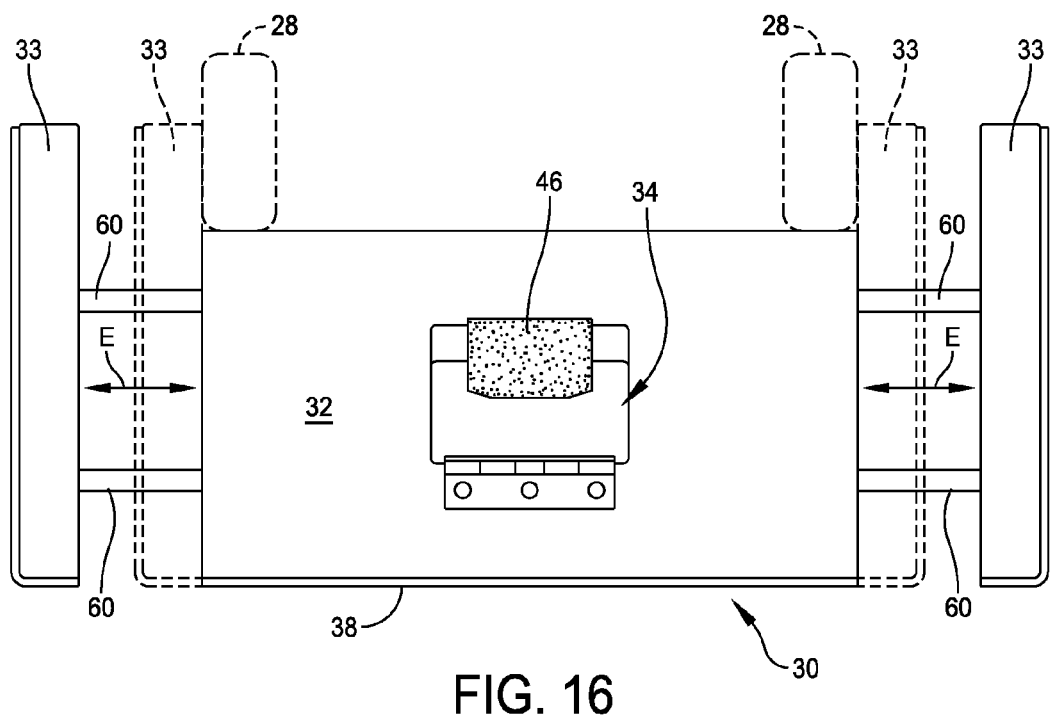
FIG. 16 is a plan view of an embodiment in which both ends of the base plate are adjustable.

Reference is now made to FIGS. 14-16 for an illustration of an adjustment feature so that each of the legs 33 may be adjusted outwardly to essentially increase the length of the center engaging recess 35. This enables adjustment so that if the wheels 28 of the vacuum cleaner are spread further apart, the holder can be adjusted in position. FIG. 16 shows both of the legs 33 having been adjusted from an inner, dotted outline, position to an outer, solid outline position. In FIGS. 15 and 16, rods 60 are shown to enable this adjustment although other adjustment mechanisms may also be provided. This adjustment is illustrated in FIG. 15 in the direction of arrows E. The embodiment illustrated in FIGS. 14-16 also includes a resilient pad 46 at the top of the upright arm 34. This pad 46 may assist in the engagement with the bracket 44 of FIG. 12.

In either of the embodiments herein, it is preferred that the upright arm be supported either at a position as shown in FIG. 2 toward the side 16A of the base plate, or at a position as illustrated in FIG. 12 in which the hinge 36 supports the upright arm 34 at a location between a midpoint line L of the base plate and an edge E of the base plate. Refer to these parameters in FIG. 14. By having the upright arm positioned in that manner, and with the direction of motion of the hose 22 as illustrated in FIG. 8, there is an automatic interlocking of the holder with the upright vacuum cleaner. Either the legs 33 in FIG. 9 in the second embodiment or the elongated side 15 in the first embodiment provide for an interlocking with the wheels so that, between the wheel interlock and the bracket interlock, the holder 10, is maintained in a fixed and firm position when the hose is stretched and begins to pull on the vacuum preventing any movement or tipping of the upright vacuum cleaner.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A combination cleaning apparatus and a holder for securing the cleaning apparatus in an upright position,
    said cleaning apparatus including a bracket that forms a locking surface,
    said holder being selectively engageable with the cleaning apparatus and including a base plate, an upright arm, and a hinge for securing the upright arm to a top surface of the base plate, a top end of the upright arm for engagement with the bracket on the cleaning apparatus so as to lock the cleaning apparatus in position relative to the holder, and the base plate positioned for engagement with a pair of spaced apart wheels of the cleaning apparatus to stabilize the cleaning apparatus, said pair of spaced apart wheels constructed and arranged for support of the cleaning apparatus by contact with a support surface upon which the cleaning apparatus rests, and said upright arm having a storage position and a use position in which the hinge is constructed and arranged so that the upright arm is disposed at an acute angle to the top surface of the base plate so that any force imposed at a top of the cleaning apparatus in a direction away from the cleaning apparatus locks the upright arm with the bracket on the cleaning apparatus, wherein the base plate is positioned, in the use position, to engage with the pair of spaced apart wheels, wherein the base plate has at least one recess facing the pair of spaced apart wheels of the cleaning apparatus, each wheel has a round surface and at least one side surface and the at least one base plate recess has respective orthogonally disposed side and facing engagement surfaces, and wherein the side engagement surface of the recess is disposed in juxtaposition to the side surface of the wheel, and the facing engagement surface of the recess is disposed facing and in juxtaposition to the round surface of the wheel.

2. The combination of claim 1 wherein the base plate has a pair of spaced apart legs extending in the direction of the cleaning apparatus and constructed and arranged for engagement with spaced apart respective wheels of the cleaning apparatus.

3. The combination of claim 2 wherein the at least one recess comprises a single recess and the pair of spaced apart legs define therebetween the single recess having an elongated facing engagement surface for engagement with the round surface of both wheels.

4. The combination of claim 2 wherein the pair of spaced apart legs is adjustable to vary the spacing therebetween so as to accommodate different cleaning apparatus having a different spacing between spaced apart respective wheels of the cleaning apparatus.

5. The combination of claim 1 wherein the at least one recess comprises at least one side recess positioned to extend toward the cleaning apparatus and constructed and arranged for engagement with a wheel of the cleaning apparatus.

6. The combination of claim 5 wherein the at least one recess comprises a pair of spaced apart recesses extending toward the cleaning apparatus and constructed and arranged for engagement with spaced apart respective wheels of the cleaning apparatus.

7. The combination of claim 6 wherein the pair of spaced apart recesses is adjustable to vary the spacing between the recesses.

8. The combination of claim 1 wherein the at least one recess is defined by a pair of parallel legs that extend from the base plate to define a single center recess defining facing side engagement surfaces and a single elongated facing engagement surface.

9. The combination of claim 8 wherein the base plate is positioned, in the use position, so that the wheels are disposed in juxtaposition to the single center recess.

10. The combination of claim 9 wherein the pair of spaced apart wheels of the cleaning apparatus has the round surface disposed in juxtaposition to the elongated facing engagement surface and the side surfaces of the wheels in juxtaposition to the respective side engagement surfaces of the single center recess.

11. The combination of claim 1 wherein the at least one recess comprises a pair of spaced apart recesses with each recess including a side engagement surface disposed in juxtaposition to an inner side surface of the wheels, and a facing engagement surface disposed in juxtaposition to the round surface of the wheel.

12. The combination of claim 1 wherein the upright arm, in the storage position thereof, is folded toward the base plate.

13. The combination of claim 12 wherein the upright arm, in the storage position thereof, is disposed substantially parallel to the base plate.

14. The combination of claim 13 including a cord attached to the holder for supporting the holder from a position separate from the wheels of the cleaning apparatus.

\* \* \* \* \*